//patents.google.com/patent/US3114373

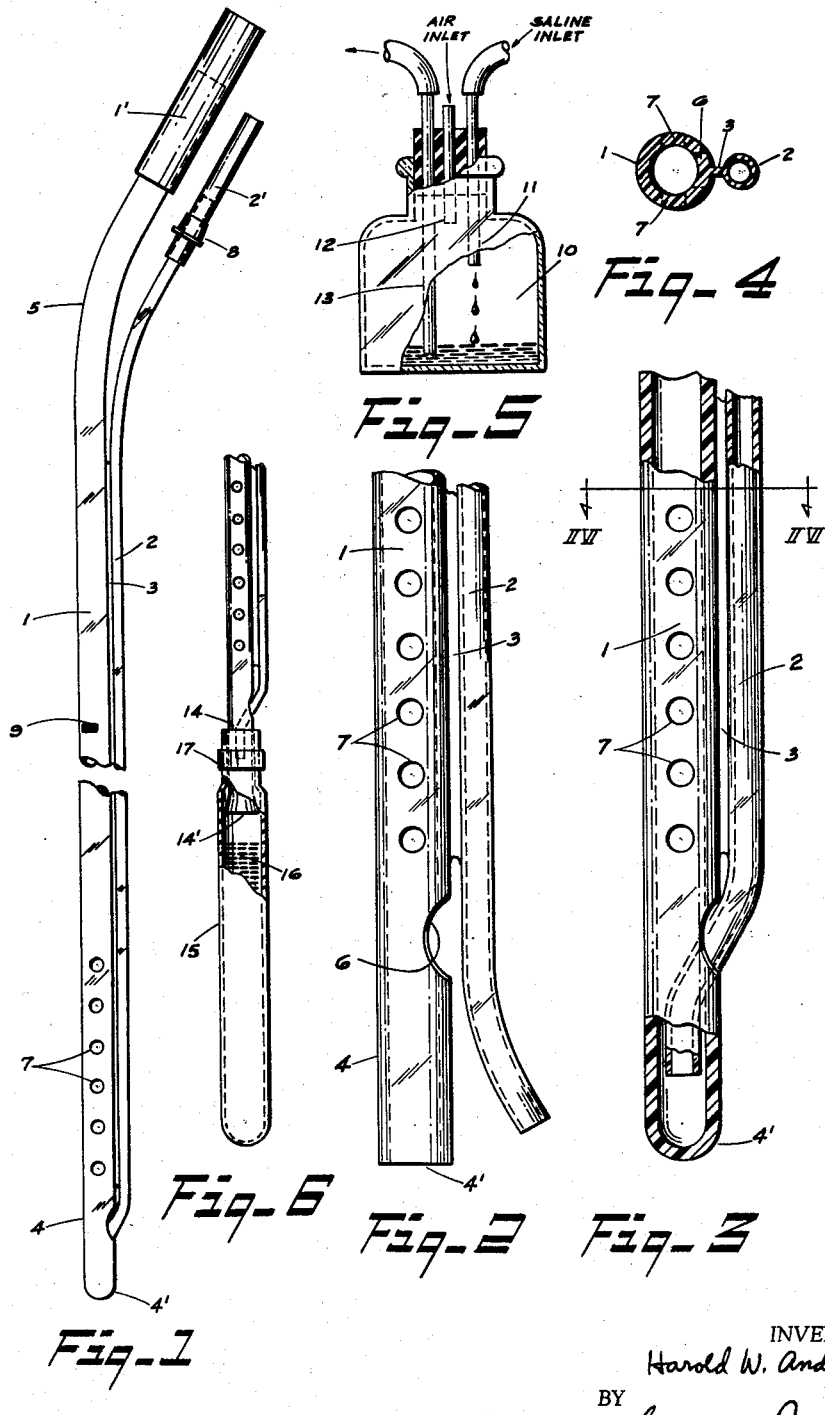

United States Patent Office 3,114,373
Patented Dec. 17, 1963

3,114,373
GASTROINTESTINAL SUMP TUBE ASSEMBLY
Harold W. Andersen, 135 E. Main St., Oyster Bay, N.Y.
Filed June 7, 1962, Ser. No. 200,804
10 Claims. (Cl. 128—350)

This invention relates to a gastrointestinal sump tube assembly for continuous aspiration of gastrointestinal secretions, and method of making same.

It is an object of the invention to provide such a tube assembly for transnasal intubation, having an air bleeder recessed at the tip of the tube, the parts being so proportioned and positioned as to prevent blocking or clogging of the tube, eliminate tissue damage and facilitate observation of the operating conditions.

It is a further object to provide such a tube in which irrigation or injection of medication can conveniently be effected by means of the air bleeder tube.

It is another object to provide certain improvements in the form, construction, arrangement and materials, and in the steps of the method of making such a tube assembly whereby the above-named and other objects may effectively be attained.

A practical embodiment of the invention is shown in the accompanying drawings, wherein:

FIG. 1 represents a view in elevation of the complete tube assembly, an intermediate section being broken away;

FIG. 2 represents a detail elevation, on an enlarged scale of the distal end portion of the tube in the course of manufacture;

FIG. 3 represents a view corresponding to FIG. 2 with the elements of the tube in desired final form and position, parts being broken away and parts being shown in section;

FIG. 4 represents a transverse section on the line IV—IV of FIG. 3;

FIG. 5 represents diagrammatically a suitable arrangement for supplying saline solution to the air tube; and FIG. 6 represents a detail elevation, partly in section, showing a slightly modified tip with weighted balloon attached, adapting the tube for intestinal use.

The tube assembly is made by extruding a non-toxic thermoplastic vinyl material as a double tube, the larger tube 1 being continuously joined to the smaller tube 2 along a narrow section 3. Sections of double tube of suitable length (e.g., 115 cm.) are cut and the two tubes are mechanically separated for a distance of about 2 cm. at the distal end 4 and 7 cm. at the proximal end 5. Adjacent the point of separation at the end 4 a hole 6 is cut in the wall of the tube 1, the hole being large enough to permit the separated end of the smaller tube 2 to be inserted (FIG. 3) and several additional holes 7 are cut or punched all the way through the wall of the tube 1 at intervals of 1 cm. or less for a suitable distance (e.g., 7 cm.) back from the tip 4'. The axes of the respective pairs of holes 7 lie in a plane at a right angle to the plane containing the axes of the tubes 1 and 2 (FIG. 4) and the diameter of the holes 7 is less than the diameter of the lumen of the larger tube 1. The tip end 4' of the tube 1 is sealed by a jet of hot air (500° F.) causing the cut end to melt into a rounded tip (FIGS. 1 and 3), preferably closed entirely, although if an approximately capillary passage remains it can be tolerated.

Both ends of the tube 2 are cut to leave them shorter than the corresponding free ends of the tube 1, the distal end being shortened sufficiently so that it stops short of the sealed end of the tube 1 when it is passed through the hole 6 (FIG. 3) and the proximal end being made about 3 cm. shorter than the adjacent end of the tube 1. On the respective proximal ends are fitted latex rubber adapter tubes 1' and 2' which may conveniently be from 5 to 7 cm. in length, telescoped on the tubes 1 and 2 and cemented in place. A metal ferrule 8 is provided as additional reinforcement for the connection between 2 and 2'.

In use, the gastrointestinal sump tube assembly is passed transnasally, as is customary, the extent of penetration being gauged by observation of a mark 9 at a known distance (e.g. 45 cm.) from the distal end. The adapter tube 1' on tube 1 is connected to a high volume, low vacuum aspirator (not shown) while the adapter tube 2' on tube 2 may be left open to draw in ambient air or may be connected to a hypodermic or other source of irrigation or medication, including a saline irrigation bottle 10 as shown in FIG. 5. In the latter figure saline is slowly dripped from a source (not shown) through the inlet 11 into the bottle 10 the stopper of which has also an air inlet 12 and an air-and-saline suction tube 13 extending to a point near the bottom of the bottle. When the tube 13 is connected to the tube 2 it will supply air and/or saline in any desired ratios depending on the rate of supply of saline through the inlet 11 and the rate of aspiration through tube 1. The air and/or saline flows constantly from the distal end of tube 2 into the space in the distal end of tube 1, mixing with the fluids which are drawn in through the holes 7, helping to prevent clogging, and completely eliminating the possibility of mucosal surfaces being damaged by suction.

In the modification shown in FIG. 6 the closed plastic tube end 14 is formed with a slight flange 14' and the open end of a long narrow balloon 15 (of very thin latex) containing 3 to 5 cc. of mercury 16 is fitted over the flange and adjacent portion of the tube end where it is cemented firmly in place. A tight rubber collar 17 may be added as a further precaution to aid in securing the balloon to the tube and in preventing it from slipping over the flange. The tube itself, in this case, may conveniently be about 2.5 meters in length. With the patient properly positioned, the small tubular weighted balloon leads the tube into the gastric antrum and thence into the duodenum, passing the pyloric sphincter very easily because the balloon assumes the shape most readily accepted by a circular muscular ring. Furthermore, the provision of the sump tip eliminates the possibility of the vacuum drawing the gastric mucosa into its lumen, which occurs with other tubes and necessarily impedes their progress. No additional irrigation is needed since the air supplied through the tube 2 constantly and automatically provides "irrigation"—with or without the addition of saline.

Constant bubbling of the contents of the aspirating tube, easily visible through the clear plastic, assures attendants that the tube is functioning properly. Bubbling also reduces the surface area of the aspirant in contact with the tube wall, thus allowing viscid material to pass readily.

The six pairs of aspirating holes have diameters smaller than that of the lumen of the aspirating tube thus preventing large particles from being drawn into the tube and obstructing it.

It will be understood that various changes may be made in the form, construction and arrangement of the several parts and the steps of the method without departing from the spirit and scope of the invention, and hence I do not intend to be limited to the details shown or described herein except as the same are included in the claims or may be required by disclosures of the prior art.

What I claim is:

1. A gastrointestinal sump tube assembly comprising, a flexible aspirating tube and a flexible air bleeder tube, at least the aspirating tube being transparent, said air bleeder tube being connected in parallel relation to and on the outside of the aspirating tube throughout most of its length, the aspirating tube having a plurality of longitudinally spaced holes in its wall near the distal end, the lumen of said aspirating tube being uniform and unobstructed from the lowest of said holes to the proximal end of said tube, and the distal end of the air bleeder tube being disposed within the aspirating tube at a point adjacent the distal end thereof, whereby the air bleeder tube supplies a fluid into the lower end of the aspirating tube to make possible visible observation of the correct operation of the aspirating tube.

2. A tube assembly according to claim 1 in which the distal end of the aspirating tube is at least substantially closed to form a tip and in which the air bleeder tube terminates at a point between the lowest hole and said tip.

3. A tube assembly according to claim 1 in which the holes are arranged in two rows, pairs of holes being opposite each other and the axes of all pairs of holes lying in a plane perpendicular to the plane containing the axes of the tubes.

4. A tube assembly according to claim 3 in which there is an additional hole in the wall of the aspirating tube having its axis in said second named plane and the distal end of the air bleeder tube being passed through said hole.

5. A tube assembly according to claim 1 which includes a tubular weighted balloon fixed to the distal end of the aspirating tube.

6. A gastrointestinal sump tube assembly comprising, an aspirating tube and an air bleeder tube, said tubes being connected in parallel relation throughout most of their length, the aspirating tube having a plurality of longitudinally spaced holes in its wall near the distal end, and the distal end of the air bleeder tube being disposed within the aspirating tube at a point adjacent the distal end thereof, the distal end of the tube being slightly enlarged to form a laterally projecting terminal flange, and the assembly including a tubular weighted balloon having a closed distal end and an open proximal end, the latter end overlying said flange and being securely fixed to the aspirating tube.

7. A tube assembly according to claim 6 in which the balloon is made of thin rubber, and which includes a collar so disposed as to hold the proximal end of the balloon firmly in engagement with the distal portion of the aspirating tube.

8. The method of making a tube assembly of the character described which includes, extruding thermoplastic material through an orifice designed to form two continuously joined parallel tubes of different diameters, cutting said extrusion in units of desired length, separating the tubes for short distances from each end, forming a plurality of holes in the wall of the larger tube near the distal end thereof and passing the adjacent separated end of the smaller tube through one of said holes.

9. The method according to claim 8 which includes heat-sealing said distal end of the larger tube and shortening the adjacent end of the smaller tube.

10. The method according to claim 8 in which the axis of said one hole lies in the same plane as the axes of the two tubes, and the axes of the other holes lie in a plane perpendicular to said first named plane.

References Cited in the file of this patent

UNITED STATES PATENTS

| | | |
|---|---|---|
| 1,114,268 | Kells | Oct. 20, 1914 |
| 1,736,182 | Wilkins | Nov. 19, 1929 |
| 1,899,781 | Twiss | Feb. 28, 1933 |
| 1,931,720 | Edginton | Oct. 24, 1933 |
| 2,230,218 | Asche | Feb. 4, 1941 |
| 2,470,665 | Stiehl | May 17, 1949 |
| 2,489,067 | Wild | Nov. 22, 1949 |
| 2,804,075 | Borden | Aug. 27, 1957 |

OTHER REFERENCES

"A Gastric Aspiration Tube," from Lancet, Oct. 29, 1955, pp. 908–909.